US006406656B1

(12) United States Patent
Thompson et al.

(10) Patent No.: US 6,406,656 B1

(45) Date of Patent: Jun. 18, 2002

(54) FABRICATION OF PHOTOCONDUCTOR DRUM INSERT

(75) Inventors: Roger Nicholas Thompson, Lafayette; Edward Wayne Weidert, Superior, both of CO (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/551,409

(22) Filed: Apr. 18, 2000

(51) Int. Cl.[7] .......................... B29C 45/26; G03G 15/00

(52) U.S. Cl. ....................... 264/328.1; 399/91; 399/159

(58) Field of Search ............................. 264/318, 328.1, 264/DIG. 67, DIG. 68; 249/57; 29/508, 516; 181/196; 101/350.3, 352.06; 399/91, 159

(56) References Cited

U.S. PATENT DOCUMENTS

| | | | | | |
|---|---|---|---|---|---|
| 4,292,386 | A | * | 9/1981 | Takano | 229/4.5 |
| 5,722,016 | A | * | 2/1998 | Godlove et al. | 399/159 |
| 5,865,443 | A | * | 2/1999 | Abe | 277/448 |
| 5,960,236 | A | | 9/1999 | Zaman et al. | |
| 5,991,573 | A | | 11/1999 | Nohsho et al. | |
| 6,075,955 | A | * | 6/2000 | Cais et al. | 399/159 |
| 6,131,003 | A | * | 10/2000 | Cais et al. | 399/159 |
| 6,205,308 | B1 | * | 3/2001 | Tanaka et al. | 399/159 |
| 6,212,342 | B1 | * | 4/2001 | Fritz | 399/159 |

FOREIGN PATENT DOCUMENTS

| | | |
|---|---|---|
| GB | 2 328 403 A | 2/1999 |

OTHER PUBLICATIONS

"Static Ships HP4000 Imaging System and Complete Product Line"; RECHARGER Magazine; Jun. 1998; p. 206 and index page; vol. 9—No. 10; Tom Enerson, publisher; Las Vegas, Nevada, USA.

* cited by examiner

*Primary Examiner*—Jill L. Heitbrink
(74) *Attorney, Agent, or Firm*—John A. Brady

(57) ABSTRACT

Inserts (1) to reduce noise from photoconductor drums during use are molded by thermal injection to have a bridge (5, 51, 5*b*) across the longitudinal gap (7, 7*a*, 6*b*) of the insert. In the preferred embodiment the bridge is centered with respect to the long dimension of the insert and the bridge is in the form of a rectangle and thin. The bridge holds the shape of the insert during cooling after molding. Subsequently, the bridge may be severed or cut out, but that is generally unnecessary.

8 Claims, 2 Drawing Sheets

FABRICATION OF PHOTOCONDUCTOR DRUM INSERT

TECHNICAL FIELD

This invention relates to photoconductor drums having inserts to prevent noise caused by the drum as it is charged by contact with a member carrying an alternating current and/or is in contact with a cleaner blade. More specifically, this invention relates to efficient fabrication of such inserts.

BACKGROUND OF THE INVENTION

Photoconductor drums typically comprise an aluminum tube coated with various materials to form a stable, photoconductive outer surface. The drums are charged in various ways, but a preferred charging technique to minimize ozone production is to contact the drum with a roller or other contacting member which carries an alternating electrical potential (AC) superimposed or a constant level potential (DC). The drum tends to react to the electrical influence of the AC signal by vibrating at a frequency twice that of the AC signal, and the sound of such vibration can be loud and shrill. It is also known that a flexible cleaner blade in contact with the drum may impart higher frequency acoustic noise to the drum.

To reduce such vibrations and eliminate or minimize the noise made by them, it is known to add weights to the inside of the drum. Various weights have been used. Often the weights are elastic in nature. However, solid weights are also used and are effective. This invention in the preferred form described employs solid weights closely similar to those which have been used commercially since 1998, with the addition of a flange which makes possible one-step molding of the weights. The weights are in the general shape of a capital letter "C" to facilitate insertion in the drum. U.S. Pat. No. 5,991,573 to Nohsho et al. and U.S. Pat. No. 5,960,236 to Zaman et al. disclose such a shape in photoconductive drum inserts.

DISCLOSURE OF THE INVENTION

The inserts of this invention can be made in an efficient single molding operation by the addition of a connection or bridge internal of the insert between two sides opposite the opening of the otherwise-generally-circular insert. The bridge makes it possible to simply remove the insert from its mold and let it cool unaltered. Without the bridge the insert would lose its shape during cooling.

Apparently to avoid the loss of shape, the prior, commercially-sold inserts mentioned in the foregoing where made as closed circles and then an opening was machined along the length of the insert to form the final "C" shape.

The inserts of this invention when molded are designed in width and length for insert in a predetermined photoconductor drum. However, they may be of various sizes to individually fit wide range of drums, so long as the drums have a hollow internal core into which the inserts may be placed. Placement is by squeezing the insert so that it collapses slightly toward its circumferential opening, moving the insert laterally into the hollow core of the drum, and then releasing the insert inside the drum.

BRIEF DESCRIPTION OF THE DRAWINGS

The details of this invention will be described in connection with the accompanying drawings, in which.

DESCRIPTION OF THE PREFERRED EMBODIMENTS

Figure 1:
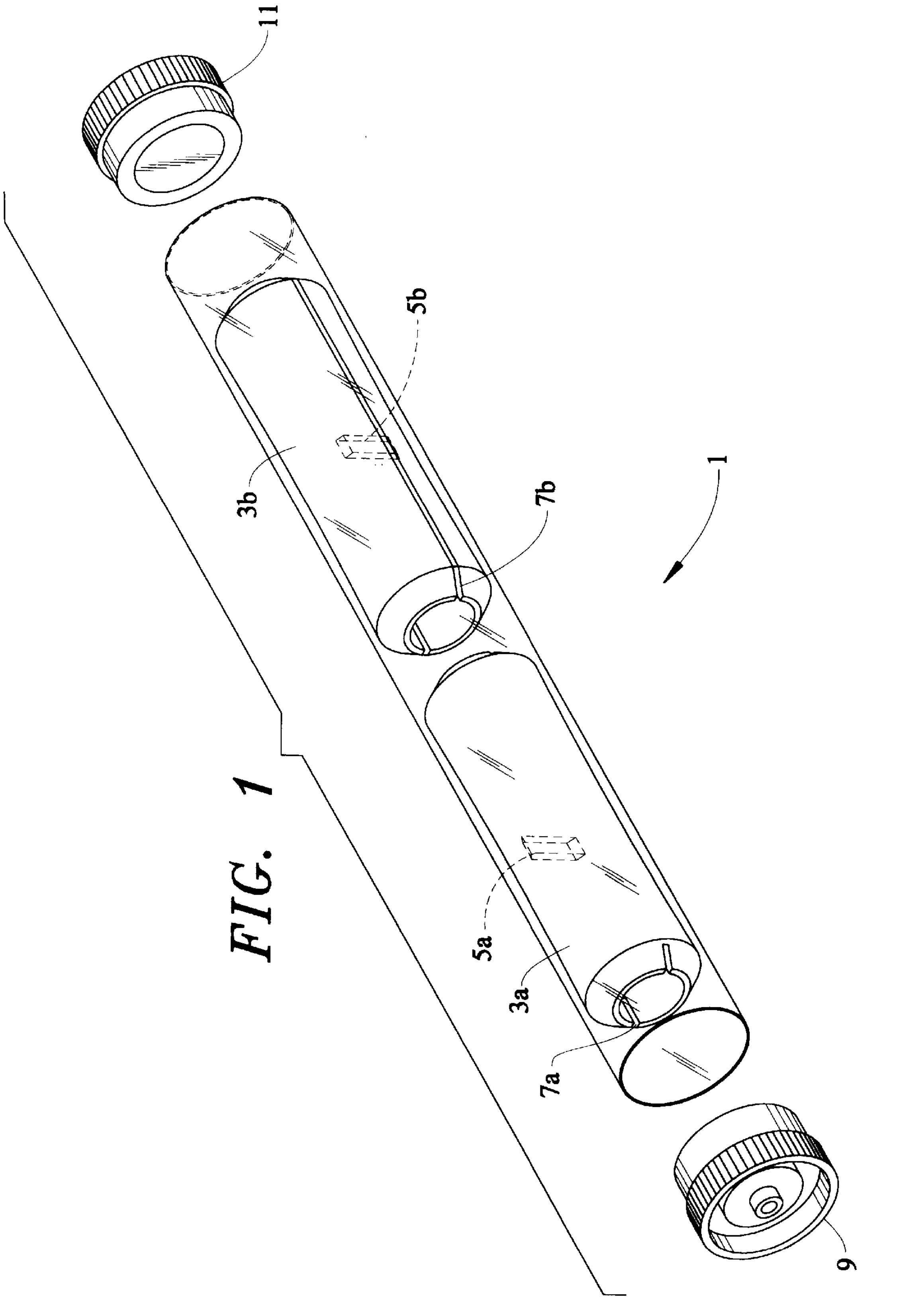
FIG. 1 shows a photoconductor drum with inserts consistent with this invention, the gears normally inserted in the ends of the drum being spaced away for visual clarity.

FIG. 1 illustrates a photoconductor drum 1 having inserts 3*a* and 3*b* consistent with this invention in the hollow core of drum 1. Photoconductor drum 1 has an outer layer, not separately shown, of photoconductive material and an inner cylinder, typically of aluminum, as a structural support. In accordance with this invention, photoconductor drum 1 is of an existing design and the inserts 3*a* and 3*b* are specifically molded to fit in that existing design. Thus, inserts 3*a* and 3*b* will have different dimensions depending on the size of the drum 1 in which they will be inserted.

For clarity inserts 3*a* and 3*b* are shown in FIG. 1 as though the drum 1 were transparent, although drum 1 is, of course, not transparent. Shown as part of each insert is bridge 5*a* centered in insert 3*a* and bridging the external gap 7*a* of insert 3*a*, and bridge 5*b* centered in insert 3*b* and bridging the external gap 7*b* of insert 3*b*.

As is typical, the photoconductor drum 1 illustrated has a driven gear 9 which in use is fixedly mounted inside the hollow core of the left side of drum 1 and an idle gear 11 which in use is fixedly mounted inside the right side of the hollow core of drum 1. Such gears and the like are indifferent to this invention and may or may not exist as shown since inserts 3*a* and 3*b* in accordance with this invention are laterally inserted before the ends of drum 1 are obstructed by the gears 9 or 11 or other structure.

Figure 2:
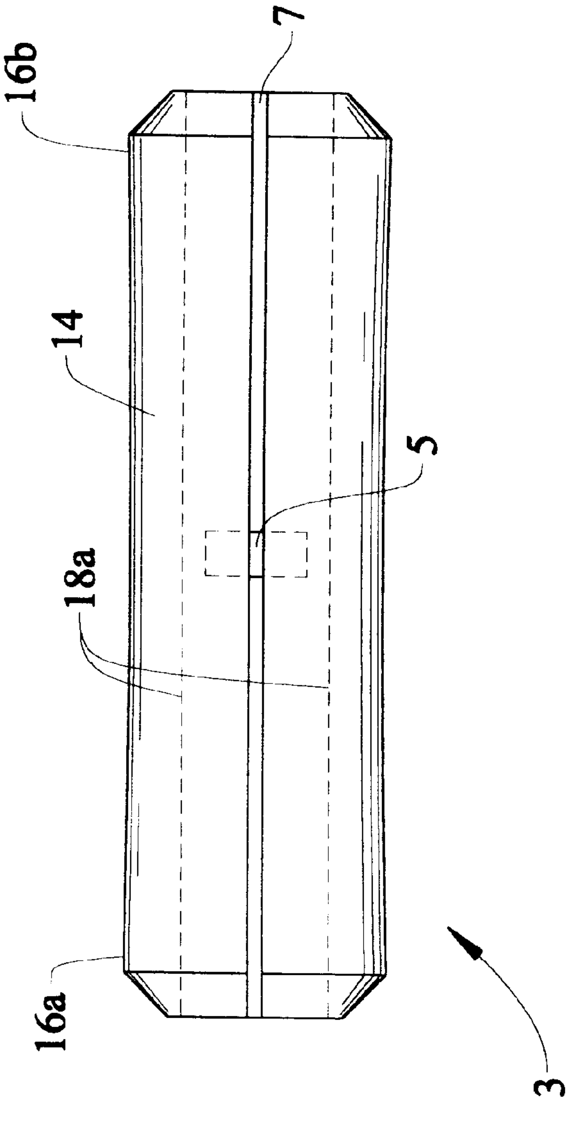
FIG. 2 is a side view of the insert of this invention.

FIG. 2 shows an insert 3 from the side, which may be either insert 3*a* or and insert 3*b* of FIG. 1. For a material with a specific gravity of about 1.3, a typical overall length may be about 10 cm. A typical overall diameter may be slightly more than 2.5 cm. The slot 7 extends through the solid, circular shell 14 and has a width of slightly more than 0.15 cm (specifically about 0.16 cm in a preferred embodiment). Insert 3 is slightly concave along its length so that only end regions 16*a* and 16*b* will contact the inner surface of drum 1 when inserted as shown in FIG. 1. This is to facilitate insertion as normal tolerance differences in manufacture could result in slight central bulges, which would hinder or block insertion if the insert 3 were designed to be perfect cylinder. End regions 16*a* and 16*b* are designed to be cylindrical with a width of about 0.15 cm each.

Figure 3:
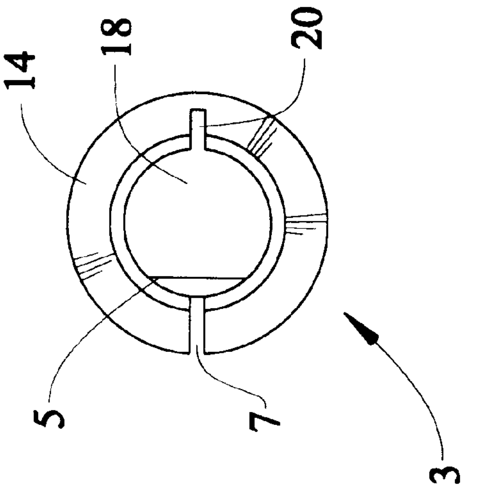
FIG. 3 is an end view of the insert of this invention.

The central opening 18 (FIG. 3) of insert 3 is shown in FIG. 2 by broken lines 18*a*. Each end of insert 3 (FIG. 2) has a reduction in size at about 45 degrees from the direction of length and of width of about 5 mm so as to further facilitate lateral insert into drum 1. As shown in FIG. 3, opposite slot 7 is a notch 20 about the width of slot 7 and extending slightly more than one-halfway through shell 14. Notch 20 weakens shell 14 to serve as a hinge so that pressure across the sides of shell 14 separated by slot 7 will result in insert 3 being compressed sufficiently to be inserted in drum 1.

The foregoing discussion with respect to FIG. 2 and FIG. 3 corresponds closely to the prior commercial insert discussed in the foregoing, although, as indicated, dimensions must conform to the drum to which the insert 3 will be inserted.

Insert 3 has bridge 5 (shown as bridges 5*a* and 5*b* in FIG. 1), which is a new element added to facilitate efficient manufacture. Bridge 5 is integral with insert 3 and spans the opening near opening 7. The exact size and location of bridge 5 is not material as bridge 5 must only be sufficiently inflexible to hold insert 1 is the "C" configuration already described during cooling while, preferably, also being sufficiently flexible to permit collapse of insert 3 to reduce gap 7 temporarily while insert 1 is latterly inserted into the hollow core of a drum 1 into the final position shown and described with respect to FIG. 1.

When placed within in a drum 1, insert 3 is released and expands outward under normal resilience of the material of insert 3. End areas 16*a* and 16*b* bind to drum 1 by friction and in use will turn with drum 1. Bridge 5 may or may not provide some significant return force so that areas 16*a* and 16*b* make firm contact with drum 1. However, bridge 5 is not necessary for that purpose, and may be removed, as by cutting or machining, after insert 3 has cooled from it molding operation, although that would be generally an unnecessary extra step.

In the embodiment shown bridge 5 is 11 mm long in the direction bridging gap 7, and bridge 5 is 5 mm wide and 2 mm thick. Bridge 5 is located in the center of the longitudinal dimension of insert 3. The outer side of bridge 5 forms a straight side across the inner side of gap 7.

Insert 3 is injection molded from a thorough mixture of 33 percent by weight glass filled NYLON 6,6 polyamide. The temperature of the mixture is raised to melt the mixture during injection. Injection is from the two sides, as they are not critical surfaces. To define bridge 5 two separate mold inserts are located in the mold, one on each side leaving space, which defines bridge 5. As viewed in FIG. 3, one mold insert would occupy all of opening 18 to the right of bridge 5 including notch 20. A second mold insert would occupy the remainder of opening 18 to the left of bridge 5 including gap 7. Either or both of these inserts can occupy the thin area on each side of bridge 5. The outer surface of insert 3 is defined by entirely conventional outer molds.

As is conventional in hot melt molding by injection of a melted material, the melted material is forced into the mold, the mold is cooled or allowed to cool until the injected material in the mold is solid but still very warm, and the mold parts and mold inserts are moved away from the molded item formed. In accordance with this invention the insert 3 formed by such injection molding is simply allowed to cool to room temperature without external bracing (the insert 3 simply rests on a surface during such cooling). Because of the existence of bridge 5 in insert 3, the gap 7 is maintained during the cooling.

Accordingly, the essential function intended for bridge 5 is to permit injection molding of the insert 3 having the gap 7 followed simply by cooling to room temperature. Although an additional step and normally unnecessary, bridge 5 could be removed or severed after the cooling to room temperature.

Glass filled polyamide is employed because of its relatively large specific gravity. The function of the inserts is to add sufficient weight to reduce noise, as discussed in the foregoing. A final weight for a particular application is determined by actual observations (by testing various weights and gauging the response of human observers). Many materials may not result in an insert or inserts of sufficient weight. Filled and unfilled polymers such as polystyrene, polyvinylchloride, and polyesters may have sufficient weight for some applications.

Alternatives and variations will be apparent and may be developed in the future as the essential element of this invention is molding the insert with the gap with an integral member spanning the gap so that the molded insert can cool to room temperature without an additional member or step.

What is claimed is:

1. A method of fabricating an insert for placement in a hollow core of a predetermined photoconductor drum having said hollow core, said insert having an outside diameter of size to contact the inside of said hollow core of said drum comprising melt injecting a thermal molding material into a mold with outer surface defining said outside diameter of said insert formed by said melt injection in said mold, said mold further defining said insert to be an elongated, generally cylindrical member having a peripheral gap extending longitudinally, an open center, and a connecting member within said open center bridging said gap and said connecting member having a longitudinal length less than said gap longitudinal length, said connecting member having sufficient rigidity during cooling to room temperature after removal of said insert from said mold to hold the shape of said gap.

2. The method as in claim 1 in which said connecting member is located only in the general center of the longitudinal dimension of said cylindrical insert.

3. The method as in claim 2 in which said connecting member is generally in the form of a rectangle with a thickness, said thickness being of order of magnitude of 2 mm, said rectangle having along dimension which bridges said gap and a short dimension, the ratio of length of said long dimension to said short dimension being generally 11 to 5.

4. The method as in claim 3 in which said long dimension is generally 11 mm and said short dimension is generally 5 mm.

5. The method as in claim 1 in which said molding material is glass filled polyamide.

6. The method as in claim 2 in which said molding material is glass filled polyamide.

7. The method as in claim 3 in which said molding material is glass filled polyamide.

8. The method as in claim 4 in which said molding material is glass filled polyamide.

* * * * *